United States Patent [19]

DeWan

[11] Patent Number: 4,903,430
[45] Date of Patent: Feb. 27, 1990

[54] FISH BAIT

[76] Inventor: Thomas E. DeWan, 5945 Carrier St., St. Petersburg, Fla. 33714

[21] Appl. No.: 308,320

[22] Filed: Feb. 8, 1989

[51] Int. Cl.$^4$ .............................................. A01K 97/02
[52] U.S. Cl. .................................... 43/44.99; 43/41
[58] Field of Search ............... 43/41, 42, 44.99, 43.12, 43/42.06, 44.2

[56] References Cited

U.S. PATENT DOCUMENTS

| | | | |
|---|---|---|---|
| 856,867 | 6/1907 | Hayward | 43/41 |
| 2,555,088 | 5/1951 | Irwin | 43/41 |
| 2,600,673 | 6/1952 | Murray | 43/41 |
| 2,780,021 | 2/1957 | Fagg | 43/41 |
| 3,415,005 | 12/1968 | Gilham | 43/44.99 |
| 3,605,316 | 9/1971 | Rogers | 43/44.99 |
| 4,232,471 | 11/1980 | Kolk | 43/44.99 |

FOREIGN PATENT DOCUMENTS 719839 7/1931 France ................................ 43/42

*Primary Examiner*—Kurt Rowan
*Attorney, Agent, or Firm*—Senniger, Powers, Leavitt and Roedel

[57] ABSTRACT

Fish bait comprising a body of fish bait material which dissolves in water. The dissolvable body is provided with a mechanism for attachment of the body to a fishing implement, such as a hook, fishing line or bait fish.

3 Claims, 1 Drawing Sheet

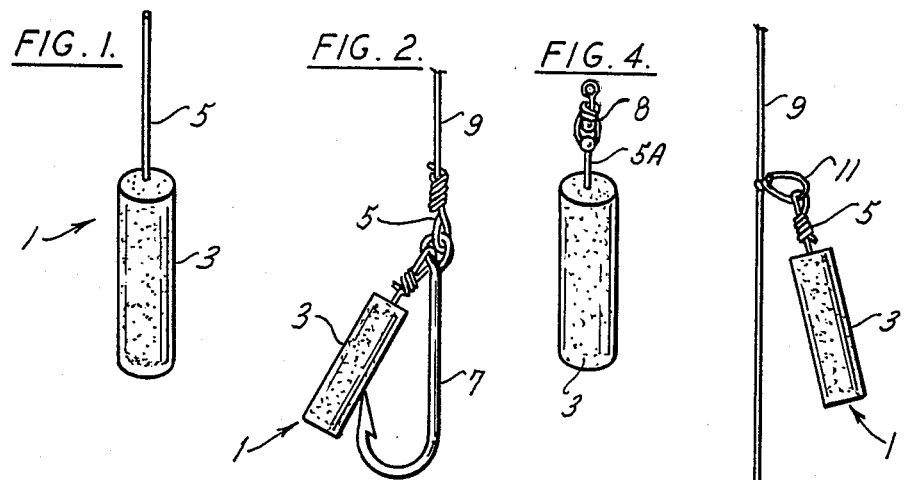
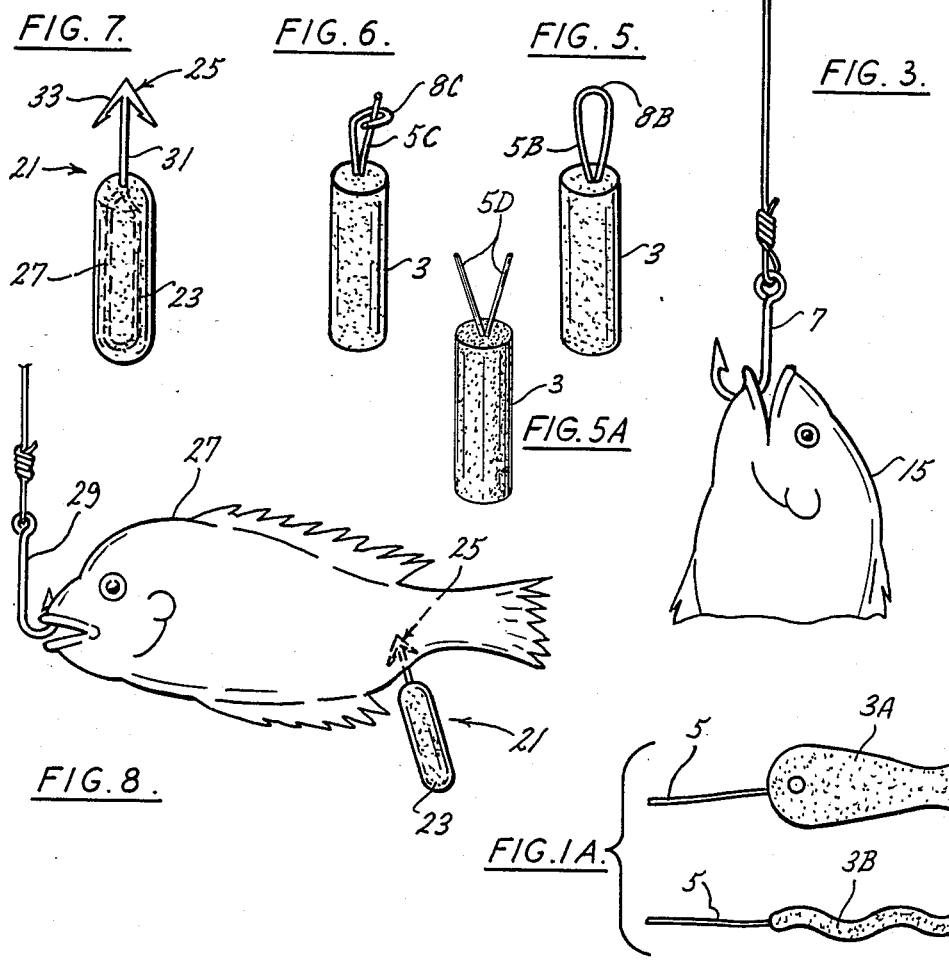

FISH BAIT

BACKGROUND OF THE INVENTION

This invention relates generally to fish bait and, more particularly, to a dissolvable fish bait having means for attachment to a fishing implement such as a hook, line, bait fish, or other baits or lures, both natural and artificial.

SUMMARY OF THE INVENTION

Among the several objects of this invention may be noted the provision of fish bait which is formed of a material adapted to dissolve in water to attract fish; the provision of such fish bait which is readily attachable to a fishing implement (e.g., a hook, line, bait fish or other baits or lures) without using tools or fasteners; the provision of such fish bait where the amount of material to be dissolved is pre-measured and precisely controllable for maximum effectiveness; the provision of such fish bait which is safe to use; and the provision of such fish bait which is simple in design for economical manufacture.

Generally, fish bait of the present invention comprises a body of fish bait material adapted to dissolve in water, and means on the body for attaching the body to a fishing implement, such as a hook, fishing line, bait fish, or other baits or lures.

Other objects and features will be in part apparent and in part pointed out hereinafter.

BRIEF DESCRIPTION OF THE DRAWINGS

FIG. 1 is an elevational view of a fish bait of the present invention;

FIG. 1A is a view of fish bait of different configurations;

FIG. 2 is a view of the fish bait of FIG. 1 attached to a fish hook;

FIG. 3 is a view similar to FIG. 2 showing the fish bait attached to a fishing line;

FIG. 4, 5, 5A and 6 are views similar to FIG. 1 showing the fish bait with different means for connecting the bait to a fishing implement;

FIG. 7 is a view of fish bait of an alternative design; and

FIG. 8 is a view of the fish bait of FIG. 7 shown inserted in a bait fish.

Corresponding parts are designated by corresponding reference numerals throughout the several views of the drawings.

DESCRIPTION OF PREFERRED EMBODIMENTS

Referring now to the drawings, and first to FIGS. 1 and 2, a fish bait of the present invention is designated in its entirety by the reference numeral 1. As shown, the fish bait comprises a body 3 of suitable fish bait material adapted to dissolve in water for attracting fish, and means indicated at 5 on the body for attaching the body to a fishing implement, such as a fish hook 7 on a fishing line 9.

As illustrated, the body 3 is generally cylindric but it will be understood that virtually any shaPe may be used (see, for example, FIG. 1A illustrating fish bait having bodies 3A and 3B in the shape of a fish and worm, respectivelY, and means designated 5 for attaching the bodies to a fishing implement). Whatever its shape, the body should be dissolvable to attract fish, as by emitting a suitable odor. As used herein, the term "dissolve" includes disintegration of any type, including disintegration by effervescing, melting, eroding, etc. The composition of the body 3 may vary according to the circumstances, such as the type of fish being fished for. For example, the body may be a suitable mixture of vegetable seed meal (e.g., corn meal), preservatives, binder materials and flavorings, such as anise oil. These materials may be mixed into an homogeneous blend and then formed (e.g., pressed or molded) into desired shaPe.

In FIG. 1 means 5 for attaching the body 3 to the fish hook 7 comprises a line of suitable material (e.g., a soft bendable wire, or a string or cord) affixed to the body 3, the line being adapted to be wrapped around, tied to or otherwise secured to the hook. As illustrated, the line 5 is embedded in the body 3 (as when the body is initially formed) and projects endwise from the body generally coaxially of the bodY. However, this specific configuration is not essential to the present invention.

FIG. 3 illustrates the fish bait 1 attached to a loop 11 in a fishing line 9, rather than directly to the hook. If attached directly to the fishing line, the bait should be reasonably close to the hook to draw the fish to he hook and the bait thereon, such as to the bait fish indicated at 15.

It is contemplated that other means for attaching the body 3 of the bait to a fishing implement may also be used. For example, various alternative means are illustrated in FIGS. 4-6. In FIG. 4 the body 3 of the bait is attached to a fishing implement by means of a swivel 8. In FIG. 5 the body 3 is attached by means of a loop 8B. In FIG. 5A, the body 3 is attached by means of two lines 5D the ends of which may be twisted together. And in FIG. 6 the body 3 is attached by means of a spring clip or snap 8C.

Referring now to FIGS. 7 and 8, there is generally indicated at 21 a fish bait of alternative design. As shown, the bait 21 comprises an elongate body 23 of dissolvable material having a barbed element generally indicated at 25 at one end of the body, the latter constituting means for attaching the body 23 to a bait fish 27 or the like on a hook 29. The barbed element 25 comprises a stem 31 projecting endwise from the body, and a V-shaped barb 33 at the outer free end of the stem adapted to be inserted into the bait fish 27 or other types of bait, such as worms, pork rinds, shrimp, squid, cut bait, dough balls, insects, plastic worms and lures, etc. The barbed element 25 may be formed as an integral part of the body or may be a separate structure suitably affixed to the body, as by being embedded in the body. The barbed element maY be substantially rigid, or it may be flexible. It may also have other shapes.

As noted, the body 23 of the bait 21 is of a dissolvable material. Any suitable bait material may be used, as discussed above with respect to fish bait 1. The barbed element 25 may also be of a dissolvable substance, or it may be of a non-dissolvable substance (e.g., plastic or metal). To prevent premature break-up, the body may be formed with a reinforcing element 27 which may be of any suitable configuration and compostition. The body 3 of the bait described above and shown in FIGS. 1-6 may also incorporate a similar reinforcing element, if necessary.

It will be understood that the fish bait 1, 21 of the present invention may incorporate means other than a line and a barbed element for attaching the dissolvable body of the bait to a fishing implement. As used herein, the term "fishing implement" means any type of fishing implement, whether aimate (e.g., a bait fish) or inanimate (e.g., a fishing or chumming line, hook or lure).

It will be further understood that the fish bait may be either large or small in size. For example, if the fish bait of the present invention is to be used by commercial fisherman for ocean fishing (e.g., used as chum on a chumming line), the body (e.g., body 3) of the bait may be very large.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. Fish bait comprising a body of fish bait material adapted to dissolve in water, and means on the body for attaching the body to a fishing implement, such as a hook, fishing line or bait fish, said attaching means comprising a barbed element adapted for insertion in a bait fish.

2. Fish bait as set forth in claim 1 wherein said barbed element is integrally formed with said body and comprises a stem projecting from the body and a barb at one end of the stem.

3. Fish bait as set forth in claim 1 wherein said body has a reinforcing element embedded therein to prevent premature break-up of the body.

* * * * *